(12) United States Patent
Wang et al.

(10) Patent No.: US 12,341,209 B2
(45) Date of Patent: Jun. 24, 2025

(54) CASING FOR BATTERY BOX, BATTERY BOX, BATTERY, AND ELECTRIC APPARATUS

(71) Applicant: CONTEMPORARY AMPEREX TECHNOLOGY (HONG KONG) LIMITED, Hong Kong (CN)

(72) Inventors: Jiajun Wang, Ningde (CN); Chunfa Wang, Ningde (CN); Yanming Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 182 days.

(21) Appl. No.: 18/330,348

(22) Filed: Jun. 6, 2023

(65) Prior Publication Data

US 2023/0318109 A1 Oct. 5, 2023

Related U.S. Application Data

(63) Continuation of application No. PCT/CN2022/096927, filed on Jun. 2, 2022.

(30) Foreign Application Priority Data

Sep. 28, 2021 (CN) .......................... 202122402969.X

(51) Int. Cl.
*H01M 50/244* (2021.01)
*H01M 10/42* (2006.01)
*H01M 50/242* (2021.01)

(52) U.S. Cl.
CPC ....... *H01M 50/244* (2021.01); *H01M 10/425* (2013.01); *H01M 50/242* (2021.01); *H01M 2010/4271* (2013.01)

(58) Field of Classification Search
CPC ............. H01M 50/244; H01M 10/425; H01M 50/242; H01M 2010/4271; H01M 50/262;
(Continued)

(56) References Cited

U.S. PATENT DOCUMENTS 4,317,497 A * 3/1982 Alt ...................... H01M 50/209
180/68.5
6,297,954 B1 10/2001 Seo
(Continued)

FOREIGN PATENT DOCUMENTS

CN 107154470 A 9/2017
CN 109546022 A 3/2019
(Continued)

OTHER PUBLICATIONS

Japan Patent Office (JPO) The Decision to Grant a patent For JP Application No. 2023-536538 Oct. 15, 2024 6 Pages (Translation Included ).
(Continued)

*Primary Examiner* — Michael L Dignan
(74) *Attorney, Agent, or Firm* — ANOVA LAW GROUP, PLLC

(57) ABSTRACT

A casing includes a body for accommodating a battery management system and a mounting member fixed on the body. The mounting member includes a first end and a second end at opposite locations. The first end is provided with an elastic member. The second end is provided with a clamping portion. The clamping portion is configured to be clamped to an assembly bracket. The elastic member is configured to generate a rebound force under limitation of the assembly bracket, so as to fix the mounting member at a location on the assembly bracket.

8 Claims, 6 Drawing Sheets

(58) Field of Classification Search
CPC .......... H01M 50/209; H01M 2220/20; H01M 50/249; H01M 50/204; Y02E 60/10
See application file for complete search history.

(56) References Cited

U.S. PATENT DOCUMENTS

| | | | | |
|---|---|---|---|---|
| 11,211,656 | B2* | 12/2021 | Matecki | H01M 50/271 |
| 2006/0216580 | A1* | 9/2006 | Schlosser | H01M 50/202 |
| | | | | 429/97 |
| 2012/0196168 | A1* | 8/2012 | Hirsch | B60L 50/64 |
| | | | | 429/99 |
| 2013/0189549 | A1 | 7/2013 | Nemoto | |
| 2013/0288530 | A1* | 10/2013 | Zhao | H01M 50/503 |
| | | | | 439/627 |
| 2018/0212292 | A1* | 7/2018 | Maguire | H01M 50/227 |
| 2022/0140430 | A1* | 5/2022 | Tate | H01M 50/209 |
| | | | | 429/163 |

FOREIGN PATENT DOCUMENTS

| | | |
|---|---|---|
| CN | 211208525 U | 8/2020 |
| CN | 212659642 U | 3/2021 |
| CN | 215988993 U | 3/2022 |
| JP | H01157472 U | 10/1989 |
| JP | H11208388 A | 8/1999 |
| JP | 2004253285 A | 9/2004 |
| JP | 2004311054 A | 11/2004 |
| JP | 2018005995 A | 1/2018 |
| KR | 102258837 B1 | 6/2021 |
| WO | 2021107517 A1 | 6/2021 |

OTHER PUBLICATIONS

The World Intellectual Property Organization (WIPO) International Search Report and Written Opinion for PCT/CN2022/096927 Jul. 27, 2022 12 pages (including English translation).
The European Patent Office (EPO) The Extended European Search Report for Application No. 22874251.6 Jan. 31, 2025 9 Pages.
The Korean Intellectual Property Office Notice of Allowance for Application No. 10-2023-7019955 Mar. 11, 2025 3 Pages (including translation).

* cited by examiner

CASING FOR BATTERY BOX, BATTERY BOX, BATTERY, AND ELECTRIC APPARATUS

CROSS-REFERENCE TO RELATED APPLICATIONS

This application is a continuation of International Application No. PCT/CN2022/096927, filed on Jun. 2, 2022, which claims priority to Chinese Patent Application No. 202122402969.X, filed on Sep. 28, 2021 and entitled "CASING FOR BATTERY BOX, BATTERY BOX, BATTERY, AND ELECTRIC APPARATUS", which are incorporated herein by reference in their entirety.

TECHNICAL FIELD

Embodiments of this application relate to the field of batteries, and in particular, to a casing for battery box, a battery box, a battery, and an electric apparatus.

BACKGROUND

Integrated with a battery closely, a BMS (Battery Management System, battery management system) monitors the voltage, current, and temperature of the battery in real time, and also performs electric leakage monitoring, thermal management, battery balance management, alarming, calculation of remaining capacity and discharge power, reporting of a percentage of a remaining battery level and battery health, and the like.

In the related art, a casing for the BMS cannot be securely fixed, the casing is apt to shake on an assembly bracket, and the assembly method is monotonous, thereby causing low assembly efficiency.

SUMMARY

In view of the foregoing problem, some embodiments of this application provide a casing for battery box, a battery box, a battery, and an electric apparatus, which can improve assembly efficiency, avoid shaking of the casing after being assembled on the bracket, and enrich assembly methods.

According to a first aspect of the embodiments of this application, a casing for battery box is provided, including: a body for accommodating a battery management system and a mounting member fixed on the body, where the mounting member includes a first end and a second end at opposite locations, the first end is provided with an elastic member, the second end is provided with a clamping portion, the clamping portion is configured to be clamped to an assembly bracket, and the elastic member is configured to generate a rebound force under limitation of the assembly bracket, so as to fix the mounting member at a location on the assembly bracket.

Through the foregoing solution, by virtue of the rebound force generated by the elastic member under the limitation of the assembly bracket, the location of the mounting member on the assembly bracket is fixed, so that the location of the casing on the assembly bracket is fixed. This application provides a new assembly method for the casing, so that assembly methods of the casing are enriched. In addition, during mounting of the casing, no additional accessory is required, and the casing only needs to be pushed into the assembly trough for clamping, thereby achieving a simple mounting process and high assembly efficiency, and saving manpower. In addition, the elastic member generates the rebound force under the limitation of the assembly bracket, and even if the casing vibrates during use, the rebound force can counteract a force generated due to the vibration, so that the casing is firmly fixed on the assembly bracket, thereby preventing the casing from shaking on the assembly bracket, improving mounting stability of the casing, and avoiding a safety risk.

In some embodiments, the elastic member includes a connecting end configured to be connected to a first end of a mounting member; and a free end, where the free end is bent toward the mounting member, and at least part of the elastic member is configured to abut against the assembly bracket to generate a rebound force.

Through the foregoing solution, the free end of the elastic member is bent toward the mounting member. When the casing is pushed to specific extent from the trough opening of the assembly trough to the trough bottom, at least part of the outer wall of the bent part of the elastic member is in contact with the trough bottom, and the elastic member begins to deform to generate the rebound force. Under action of the rebound force, the location of the casing on the assembly bracket can be fixed.

In some embodiments, the free end has a straight section, and a side, farther away from the mounting member, of the straight section is configured to abut against the assembly bracket.

Through the foregoing solution, a straight section is disposed at the free end, and the straight section abuts against the trough bottom of the assembly bracket, which can increase an abutting surface, reduce a risk of slipping when the free end abuts against the trough bottom, and reduce a probability of abutting failure, thereby improving assembly stability of the casing on the assembly bracket.

In some embodiments, the first end is further provided with a limiting portion, and the limiting portion is configured to limit the curvature of the elastic member.

Through the foregoing solution, the limiting portion is located between the first end of the mounting member and the free end of the elastic member. When the amount of deformation of the elastic member is relatively large, the free end is in contact with the limiting portion instead of the first end of the mounting member, thereby avoiding wear on the first end of the mounting member. In addition, the limiting portion is closer to the free end than the first end, which reduces a movable range of the free end of the elastic member, so that the curvature of the limiting portion is further limited to avoid a failure of the elastic member caused by excessive deformation.

In some embodiments, a maximum distance between a bent portion of the elastic member and the connecting end is L, and a distance between the free end and the limiting portion is D, where L=(3.5 to 4.5)*D.

Through the foregoing solution, when L and D satisfy the foregoing multiple relationship, the elastic member can be deformed within an elastic deformation capacity range of the elastic member, and the rebound force generated by the elastic member can keep the location of the casing on the assembly bracket unchanged.

In some embodiments, the casing further includes a limiting plate, where two opposite plate surfaces of the limiting plate are respectively fixed on the body and the mounting member, and at least part of the limiting plate is configured to abut against an inner wall of the assembly bracket to fix the casing at a location on the assembly bracket.

Through the foregoing solution, when the entire casing is pushed from the trough opening of the assembly trough to the trough bottom, at least part of a plate surface of a limiting plate can be in contact with an inner wall of the assembly bracket, and at least part of a plate surface of the other limiting plate can be in contact with another inner wall of the assembly bracket, so that the mounting member can be well guided and positioned to ensure that the two mounting members on the two sides of the body are exactly located in the corresponding assembly trough. In addition, the two limiting plates can have a limiting function, to avoid a decrease in assembly stability of the casing on the assembly bracket caused because the casing moves in a direction of a line connecting the two opposite walls of the assembly bracket.

In some embodiments, the mounting member has at least one notch along an extension direction of the mounting member.

Through the foregoing solution, weight of the mounting member can be reduced, so that weight of the casing can be reduced. In addition, surface areas of the two opposite surfaces of the mounting member that are parallel to the trough wall can be reduced, and therefore, a contact area between the mounting member and the trough wall can be reduced, and a frictional force between the mounting member and the trough wall can be reduced when the casing is pushed into the assembly trough, to avoid wear on the mounting member and the trough wall, which can also reduce the pushing force to facilitate pushing of the casing into the assembly trough, thereby improving assembly efficiency of the casing.

According to a second aspect of some embodiments of this application, a battery box is provided, including an assembly bracket and the casing in the first aspect, where the casing is assembled on the assembly bracket.

According to a third aspect of some embodiments of this application, a battery is provided, including a battery cell and the box in the second aspect, where the box is configured to accommodate the battery cell.

According to a fourth aspect of some embodiments of this application, an electric apparatus is provided, including the battery in the third aspect, where the battery is configured to supply electric energy.

In this embodiment of this application, by virtue of the rebound force generated by the elastic member under the limitation of the assembly bracket, the location of the mounting member on the assembly bracket is fixed, so that the location of the casing on the assembly bracket is fixed. A new assembly method is provided for the casing, so that assembly methods of the casing are enriched. In addition, during mounting of the casing, no additional accessory is required, and the casing only needs to be pushed into the assembly trough for clamping, thereby achieving a simple mounting process and high assembly efficiency, and saving manpower. In addition, the elastic member generates the rebound force under the limitation of the assembly bracket, and even if the casing vibrates during use, the rebound force can counteract a force generated due to the vibration, so that the casing is firmly fixed on the assembly bracket, thereby preventing the casing from shaking on the assembly bracket, improving mounting stability of the casing, and avoiding a safety risk.

The foregoing description is merely an overview of the technical solutions in the embodiments of this application. In order to better understand the technical means in the embodiments of this application, to achieve implementation according to content of the specification, and to make the above and other objects, features, and advantages in the embodiments of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

Figure 1:
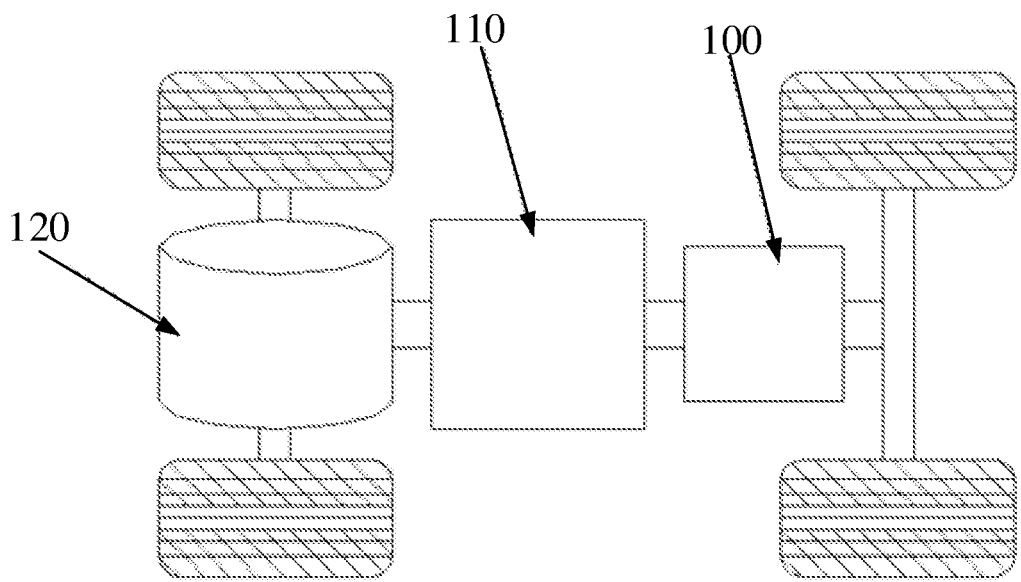
FIG. 1 is a schematic structural diagram of a vehicle according to an embodiment of this application.

REFERENCE SIGNS 1. vehicle; 100. battery; 110. controller; 120. motor; 201. first box; 202. second box; 300. battery module; 400. battery cell; 401. housing; 402. end cover; 402b. electrode terminal; 403. electrode assembly; 5. casing; 51. body; 52. mounting member; 521. elastic member; 521a. connecting end; 521b. free end; 521c. opening; 521d. straight section; 522. clamping portion; 523. limiting portion; 524. notch; 53. limiting plate; 6. assembly bracket; 61. assembly trough; 61a. trough opening; 61b. trough wall; 61c. trough bottom; 61d. slot; X. length direction of battery cell; Y. width direction of battery cell; and Z. height direction of battery cell.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

Unless otherwise defined, meanings of all technical and scientific terms used in this specification are the same as those commonly understood by persons skilled in the art of this application. The terms used in this specification of this application are merely intended to describe specific embodiments, but not to limit this application.

The terms "comprise", "include", and any variants thereof in the descriptions of the specification, claims, and accompanying drawings of this application are intended to cover a non-exclusive inclusion. The word "a" or "an" does not exclude existence of more than one.

The term "embodiment" described herein means that specific features, structures or characteristics in combination with descriptions of the embodiments may be incorporated in at least one embodiment of this application. The word "embodiment" in various locations in the specification does not necessarily refer to a same embodiment, or an independent or alternative embodiment that is exclusive of other embodiments. It is explicitly or implicitly understood by persons skilled in the art that the embodiments described herein may be combined with other embodiments.

The term "and/or" in this specification is only an associative relationship for describing associated objects, indicating that three relationships may be present. For example, A and/or B may indicate three cases: presence of only A; presence of both A and B; and presence of only B. In addition, a character "/" in this specification generally indicates an "or" relationship between contextually associated objects.

The orientation terms appearing in the following description all are directions shown in the figures, and are not intended to limit the specific structure of a casing for battery box, a battery box, and a battery in this application. For example, in the descriptions of this application, the orientations or positional relationships indicated by the terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of descriptions of this application rather than indicating or implying that the apparatuses or components mentioned must have specific orientations or must be constructed or manipulated according to specific orientations, and therefore shall not be construed as any limitations on this application.

In addition, expressions such as the direction X, the direction Y, and the direction Z that are used to describe indication directions of operations and constructions of various members of the casing for battery box, the battery box, and the battery in the embodiments are relative rather than absolute. Although these indications are appropriate when the members of the battery pack are located at the locations shown in the figures, these directions shall be interpreted differently when the locations change, to reflect the changes.

In addition, the terms "first", "second" and the like in the specification and the claims or the above accompanying drawings of this application are used to distinguish between different objects but not describe a specific sequence, and can explicitly or implicitly include one or more features.

In the descriptions of this application, unless otherwise specified, "plurality" means more than two (including two). Likewise, "multiple groups" means more than two groups (including two groups).

In the descriptions of this application, it should be noted that, unless otherwise specified and defined explicitly, the terms "installed", "connected" and "connection" should be understood broadly. For example, "connected" or "connection" of a mechanical structure may indicate physical connection. For example, the physical connection may be fixed connection, for example, fixed connection by using a fixing member such as a screw, a bolt or other fixing members; or the physical connection may be detachable connection, for example, connection by mutual clamping or clamping; or the physical connection may be an integral connection, for example, connection by welding, bonding or integral forming. "Connected" or "connection" of a circuit structure may indicate physical connection, and may also indicate electrical connection or signal connection, for example, may be direct connection, that is, the physical connection, may be indirect connection by using at least one component in between as long as circuit communication is implemented, and may also be communication between two components; and the signal connection may be signal connection by using a circuit, and may also be signal connection by using a media medium, such as a radio wave. Persons of ordinary skill in the art can understand specific meanings of these terms in this application based on specific situations.

The battery mentioned in the embodiments of this application is a single physical module that includes one or more battery cells for providing a higher voltage and capacity. For example, the battery mentioned in this application may include a battery module, a battery pack, or the like. For ease of description, the battery module, the battery pack, and the like may be collectively referred to as the battery. A battery typically includes a box configured to enclose one or more battery cells. The box includes a casing and an assembly bracket for assembling the casing, and the casing can accommodate a battery management system. The box can prevent liquids or other foreign matter from affecting charging or discharging of the battery cell.

In a related art, mounting portions are disposed at a plurality of locations on a side wall of the casing, each mounting portion is provided with a first threaded hole, and a second threaded hole is disposed at a location, opposite each first threaded hole, of the assembly bracket. A plurality of bolts are prepared, and after an end of each bolt is sequentially passed through the first threaded hole and the second threaded hole at opposite locations, the bolt is locked with a nut to achieve assembly of the casing on the assembly bracket. It can be seen that in the related art, the plurality of bolts and a plurality of nuts are required to fix the casing on the assembly bracket, and a large number of accessories are required. During the assembly, the bolt and the nut need to be manually mounted via many mounting processes, thereby causing low assembly efficiency and requiring a large amount of manpower. In addition, the battery and the casing in the battery vibrate during use. As use time prolongs, the bolt and the nut for fixing the casing are apt to loosen, and as a result, the casing is apt to shake on the assembly bracket, thereby causing a safety risk.

In view of this, an embodiment of this application provides a casing for battery box, and the casing includes a body for accommodating a battery management system and a mounting member fixed on the body. Herein, a first end of the mounting member is provided with an elastic member, and a second end is provided with a clamping portion. During mounting of the casing, the clamping portion can be clamped to the assembly bracket, an elastic member can generate a rebound force under limitation of the assembly bracket, and under action of the rebound force, the mounting member is fixed at a location on the assembly bracket, so that the casing is fixed at a location on the assembly bracket.

Compared with the related art, in this embodiment of this application, during mounting of the casing, no additional accessory is required, and the casing only needs to be pushed into an assembly trough of the assembly bracket for clamping, thereby achieving a simple mounting process and high assembly efficiency, and saving manpower. In addition, the elastic member generates the rebound force under the limitation of the assembly bracket, and even if the casing vibrates during use, the rebound force can counteract a force generated due to the vibration, so that the mounting member is firmly fixed on the assembly bracket, thereby preventing the casing from shaking on the assembly bracket, improving mounting stability of the casing, and avoiding a safety risk.

The casing 5 disclosed in this embodiment of this application may be configured to accommodate a battery management system, and the battery management system may be used without limitation in an electric apparatus such as a vehicle 1, a ship, or an aircraft.

An embodiment of this application provides an electric apparatus that uses a battery 100 as a power supply. The battery includes a battery management system. The electric apparatus may be, but is not limited to, a mobile phone, a tablet, a laptop computer, an electric toy, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric apparatus of an embodiment of the application being a vehicle 1 is used as an example for description of the following embodiments.

Referring to FIG. 1, FIG. 1 is a schematic structural diagram of a vehicle 1 according to some embodiments of this application. The vehicle 1 may be an oil-fueled vehicle, a gas-powered vehicle, or a new energy vehicle. The new energy vehicle may be a battery electric vehicle, a hybrid electric vehicle, an extended-range electric vehicle, or the like. The vehicle 1 is provided with a battery 100 inside, where the battery 100 may be disposed at the bottom, front or rear of the vehicle 1. The battery 100 may be configured to supply power to the vehicle 1. For example, the battery 100 may be used as an operational power supply for the vehicle 1. The vehicle 1 may further include a controller 110 and a motor 120, where the controller 110 is configured to control the battery 100 to supply power to the motor 120, for example, to satisfy power needs of start, navigation, and driving of the vehicle 1.

In some embodiments of this application, the battery 100 can be used as not only the operational power supply for the vehicle 1 but also a driving power supply for the vehicle 1, replacing or partially replacing fossil fuel or natural gas to provide driving traction for the vehicle 1.

Figure 2:
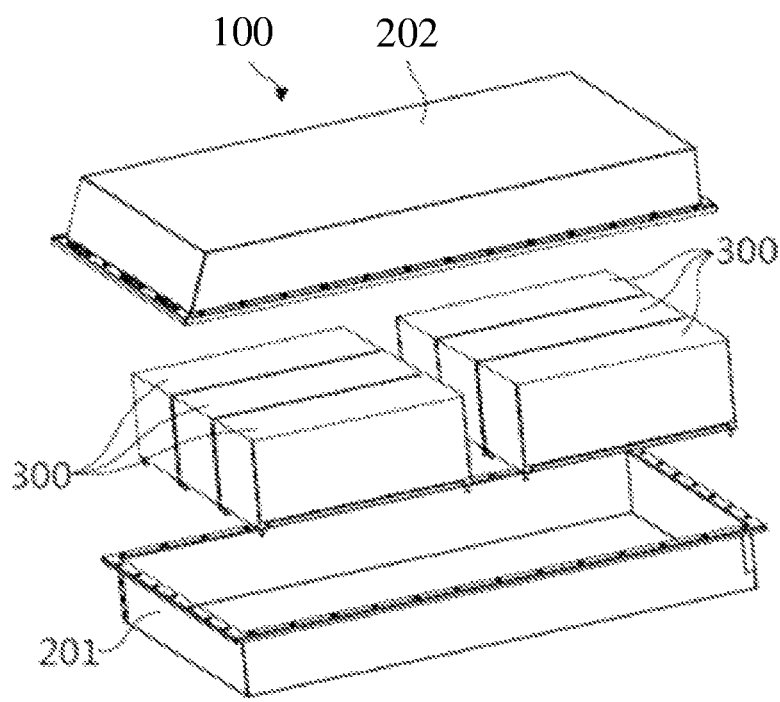
FIG. 2 is a schematic structural diagram of a battery according to an embodiment of this application.

As shown in FIG. 2, in order to achieve a higher function of the battery 100 to meet a use need, in some embodiments, the battery 100 may include a plurality of battery modules 300 electrically connected to each other. The battery includes a first box 201, a second box 202, and a plurality of battery modules 300. The first box 201 and the second box 202 are buckled with each other. The plurality of battery modules 300 are arranged in space enclosed by the first box 201 and the second box 202. In some embodiments, the first box 201 and the second box 202 may be made of aluminum, aluminum alloy, or another metal material, and the first box 201 and the second box 202 are hermetically connected.

Figure 3:
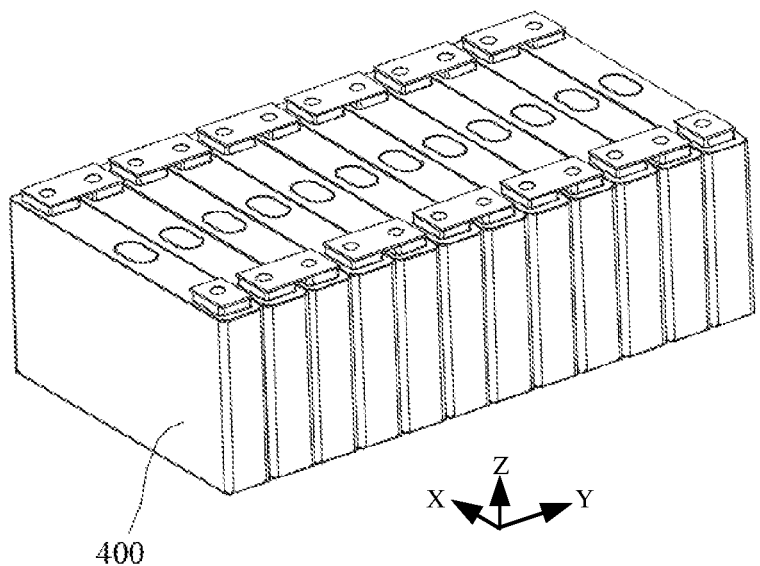
FIG. 3 is a schematic structural diagram of a battery module according to an embodiment of this application.

FIG. 3 is a schematic structural diagram of a battery module 300 according to an embodiment of this application. In FIG. 3, the battery module 300 may include a plurality of battery cells 400. The plurality of battery cells 400 may first be connected in series, parallel, or series-parallel to constitute battery modules, and then a plurality of battery modules 300 may be connected in series, parallel, or series-parallel to constitute a battery 100. In this application, the battery cell 400 may include a lithium-ion battery, a sodium-ion battery, a magnesium-ion battery, or the like. This is not limited in the embodiments of this application. The battery cell 400 may be cylindrical, flat, rectangular, or another shape, and this is also not limited in the embodiments of this application. The battery cells 400 are usually categorized into three types depending on their packaging: a cylinder battery cell 400, a prismatic battery cell 400, and a pouch battery cell 400, and this is also not limited in the embodiments of this application. However, for brevity of description, the following embodiments are all described by taking a prismatic cell 400 as an example.

Figure 4:
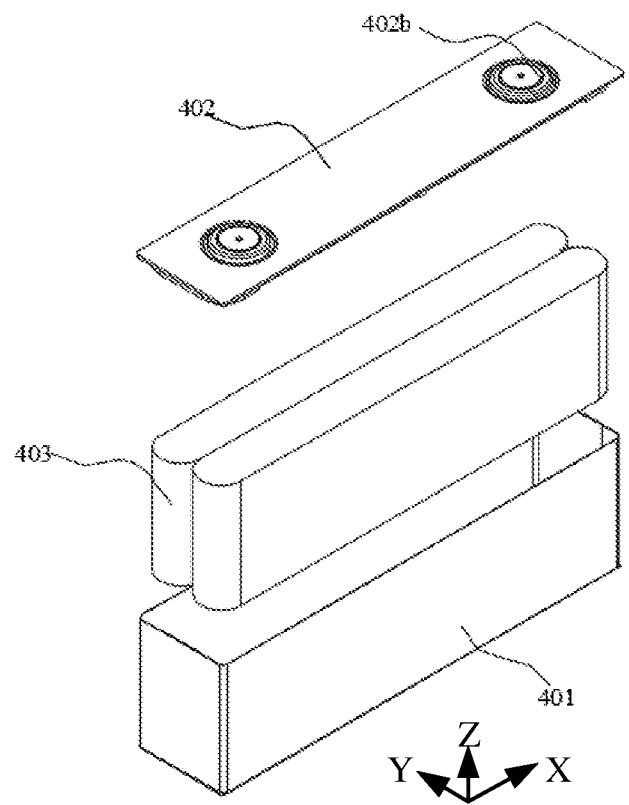
FIG. 4 is a schematic structural diagram of a battery cell according to an embodiment of this application.

FIG. 4 is a schematic structural exploded view of a battery cell 400 according to some embodiments of this application; The battery cell 400 refers to a smallest unit constituting a battery. As shown in FIG. 4, the battery cell 400 includes an end cover 402, a housing 401, and an electrode assembly 403.

The end cover 402 refers to a component that covers an opening of the housing 401 to isolate an internal environment of the battery cell 400 from an external environment. A shape of the end cover 402 is not limited and may be adapted to a shape of the housing 401 to fit the housing 401. Optionally, the end cover 402 may be made of a material with specified hardness and strength (for example, aluminum alloy), so that the end cover 402 is less likely to deform when subjected to extrusion and collision, allowing the battery cell 400 to have higher structural strength and enhanced safety performance. A functional component such as an electrode terminal 402b may be provided on the end cover 402. The electrode terminal 402b may be configured to be electrically connected to the electrode assembly 403 for outputting or inputting electric energy of the battery cell 400. In some embodiments, the end cover 402 may further be provided with a pressure relief mechanism for releasing internal pressure when the internal pressure or temperature of the battery cell 400 reaches a threshold. The end cover 402 may also be made of various materials, such as copper, iron, aluminum, stainless steel, aluminum alloy, and plastic, which are not particularly limited in the embodiments of this application. In some embodiments, an insulator may also be provided at an inner side of the end cover 402. The insulator may be configured to isolate an electrically connected component in the housing 401 from the end cover 402 to reduce a risk of short circuit. For example, the insulator may be made of plastic, rubber, or the like.

The housing 401 is an assembly configured to fit the end cover 402 to form an internal environment of the battery cell 400, where the formed internal environment can be used to accommodate the electrode assembly 403, an electrolyte (not shown in the figure), and another component. The housing 401 and the end cover 402 may be separate components, an opening may be provided on the housing 401, and the end cover 402 covers the opening to form the internal environment of the battery cell 400. The end cover 402 and the housing 401 are not limited and may alternatively be integrated. Specifically, the end cover 402 and the housing 401 may form a shared connection surface before other components are disposed inside the housing, and then the housing 401 is covered with the end cover 402 when the inside of the housing 401 needs to be enclosed. The housing 401 may be of various shapes and sizes, for example, a cuboid shape, a cylindrical shape, and a hexagonal prism shape. Specifically, a shape of the housing 401 may be determined according to a specific shape and size of the electrode assembly 403. The housing 401 may be made of various materials, such as copper, iron, aluminum, stainless steel, aluminum alloy, and plastic, which are not particularly limited in the embodiments of this application.

The electrode assembly 403 is a component in which electrochemical reactions occur in the battery cell 400. The housing 401 may include one or more electrode assemblies 403. The electrode assembly 403 is mainly formed by winding or stacking a positive electrode plate and a negative electrode plate, and a separator is generally disposed between the positive electrode plate and the negative electrode plate. The parts with an active substance on the positive electrode plate and the negative electrode plate constitute a body portion of the cell assembly, and the parts without the active substance on the positive electrode plate and the negative electrode plate respectively constitute tabs (not shown in the figure). A positive tab and a negative tab may both be located at one end of the body portion or be located at two ends of the body portion respectively. During charge and discharge of the battery, a positive electrode active substance and a negative electrode active substance react with an electrolyte, and the tabs are connected to the electrode terminals to form a current loop.

Figure 5:
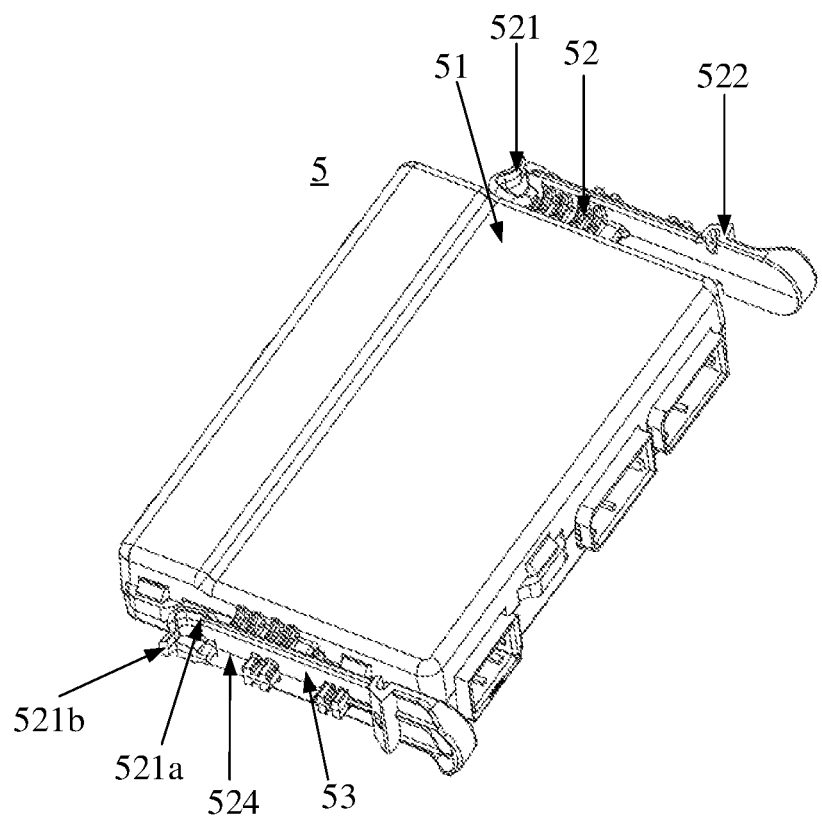
FIG. 5 is a schematic structural diagram of a casing for battery box according to an embodiment of this application.

The casing 5 disclosed in the embodiments of this application is described in detail below with reference to the accompanying drawings. FIG. 5 is a schematic structural diagram of a casing 5 according to an embodiment of this application. As shown in FIG. 5, the casing 5 includes a body 51 for accommodating a battery management system and a mounting member 52 fixed on the body 51. Herein, the mounting member 52 includes a first end and a second end at opposite locations, the first end is provided with an elastic member 521, the second end is provided with a clamping portion 522, the clamping portion 522 is configured to be clamped to an assembly bracket 6, and the elastic member 521 is configured to generate a rebound force under limitation of the assembly bracket 6, so as to fix the mounting member 52 at a location on the assembly bracket 6.

The body 51 includes a first housing and a second housing, and the first housing and the second housing are snap-fitted together to form space for accommodating a battery management system. In some examples, the first housing may be a plate-shaped structure, the second housing may be a hollow structure with an end open, and the first housing is snap-fitted at the open side of the second housing, so that the first housing and the second housing jointly define the space for accommodating the battery management system; or the first housing and the second housing may both be hollow structures with an end open, and the open side of the first housing is snap-fitted at the open side of the second housing. The first housing and the second housing may be made of aluminum, aluminum alloy, or another metal material, and the first housing and the second housing are hermetically connected. The first housing and the second housing can be formed via extrusion molding, to facilitate forming of the first housing and the second housing of different sizes. As shown in FIG. 5, the body 51 is a rectangular housing structure, the body 51 is enclosed by two surfaces and four side walls at opposite locations, and the four side walls include two pairs of side walls at opposite locations.

There may be two mounting members 52, and the two mounting members 52 are respectively fixed on the two side walls of the body 51 at opposite locations, and the mounting members 52 can be disposed parallel to the side walls of the body 51 on which the mounting members 52 are fixed. The two mounting members 52 on the two sides of the body 51 may or may not be on the same plane, which is not limited in this embodiment of this application.

The mounting member 52 has a first end and a second end at opposite locations in an extension direction of the mounting member 52. When the casing 5 is mounted, the first end is an end of the mounting member 52 that first comes into contact with the assembly bracket 6, and the second end is an end of the mounting member 52 that latter comes into contact with the assembly bracket 6.

Figure 6:
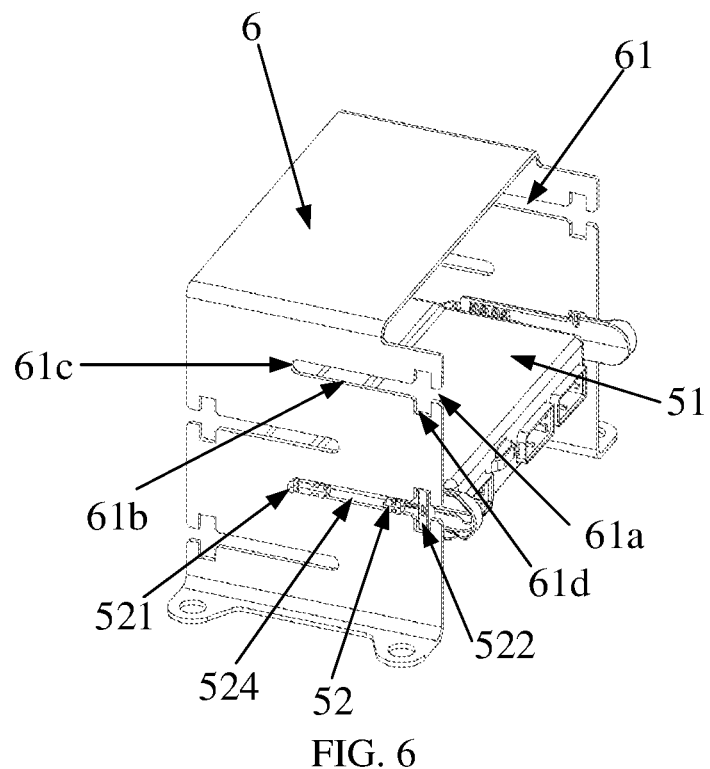
FIG. 6 is a schematic diagram of assembling a casing for battery box on an assembly bracket according to an embodiment of this application.

As shown in FIG. 6, the assembly bracket 6 involved in this embodiment of this application has two walls at opposite locations, the two walls each are provided with an assembly trough 61, the assembly trough 61 has a trough opening 61a, a trough wall 61b, and a trough bottom 61c, and a slot 61d is provided at a location, closer to the trough opening 61a, on the trough wall 61b of the assembly trough 61. In order to fit the two mounting members 52 on the two sides of the body 51 onto the same plane, the assembly troughs 61 disposed on the two opposite walls of the assembly bracket 6 are opposite each other. In order to fit the two mounting members 52 on the two sides of the body 51 onto different planes, the assembly troughs 61 disposed on the two opposite walls of the assembly bracket 6 may not be opposite each other, as long as it is ensured that when the casing 5 is mounted, the two mounting members 52 on the two sides of the body 51 can be respectively located in the two assembly troughs 61 of the assembly bracket 6.

When the casing 5 needs to be mounted, the mounting member 52 of the casing 5 is placed at a location of the trough opening 61a of the assembly trough 61, and a pushing force is applied to the casing 5 to push the casing 5 from the trough opening 61a to the trough bottom 61c. When the casing 5 is pushed to specific extent, the elastic member 521 at the first end of the mounting member 52 comes into contact with the trough bottom 61c, and the trough bottom 61c limits the elastic member 521 and applies a force on the elastic member 521 toward the trough opening 61a. The elastic member 521 is compressed and deformed under the pushing force and limitation of the trough bottom 61c to generate the rebound force. As the pushing force is continuously applied, the elastic member 521 is further compressed, and the generated rebound force is further increased until the clamping portion 522 at the second end of the mounting member 52 is clamped into the slot 61d of the assembly trough 61. Application of the pushing force is stopped when the clamping portion 522 is clamped into the slot 61d. In this case, the elastic member 521 is still in a compressed state, and the rebound force of the elastic member 521 enables the elastic member 521 to press against the trough bottom 61c, and enables the clamping portion 522 to be clamped into the slot 61d tightly, so that a location of the mounting member 52 relative to the assembly trough 61 is fixed, thereby fixing the casing 5 on the assembly bracket 6.

In the casing 5 provided in this embodiment of this application, by virtue of the rebound force generated by the elastic member 521 under the limitation of the assembly bracket 6, the location of the mounting member 52 on the assembly bracket 6 is fixed, so that the location of the casing 5 on the assembly bracket 6 is fixed. This application provides a new assembly method for the casing 5, so that assembly methods of the casing 5 are enriched. In addition, during mounting of the casing 5, no additional accessory is required, and the casing 5 only needs to be pushed into the assembly trough 61 for clamping, thereby achieving a simple mounting process and high assembly efficiency, and saving manpower. In addition, the elastic member 521 generates the rebound force under the limitation of the assembly bracket 6, and even if the casing 5 vibrates during use, the rebound force can counteract a force generated due to the vibration, so that the casing 5 is firmly fixed on the assembly bracket 6, thereby preventing the casing 5 from shaking on the assembly bracket 6, improving mounting stability of the casing 5, and avoiding a safety risk.

In some embodiments, the elastic member 521 may include a connecting end 521*a* and a free end 521*b*, the connecting end 521*a* is configured to be connected to the first end of the mounting member 52, and the free end 521*b* is configured to abut against the trough bottom 61*c* of the assembly trough 61 and move toward the connecting end 521*a* of the elastic member 521 under the limitation of the trough bottom 61*c*, so that the elastic member 521 is compressed to generate a rebound force.

Exemplarily, the elastic member 521 may be a spring. Parameters such as unfolded length and free height of the elastic member 521 can be set as required, as long as it is ensured that when the casing 5 is assembled on the assembly bracket 6, the rebound force generated by the elastic member 521 is sufficient to clamp the mounting member 52 in the assembly trough 61 tightly, which is not limited in this embodiment of this application. Herein, the unfolded length of the elastic member 521 refers to length of steel wire that needs to be wound to form the elastic member 521, and the free height of the elastic member 521 refers to height of the elastic member 521 under no external force.

In this embodiment, when the casing 5 is pushed toward the assembly trough 61 to specific extent, the free end 521*b* of the elastic member 521 abuts against the trough bottom 61*c*, and the elastic member 521 is compressed and deformed under the pushing force and limitation of the trough bottom 61*c* to generate the rebound force. As the pushing force is continuously applied, the free end 521*b* moves toward the connecting end 521*a*, the elastic member 521 is further compressed, the rebound force is increased, and application of the pushing force is stopped when the clamping portion 522 is clamped into the slot 61*d*. The rebound force of the elastic member 521 enables the elastic member 521 to press against the trough bottom 61*c*, and enables the clamping portion 522 to be clamped into the slot 61*d*, so that a location of the mounting member 52 relative to the assembly trough 61 is fixed, thereby fixing the casing 5 on the assembly bracket 6.

In some other embodiments, as shown in FIG. 5 and FIG. 7 to FIG. 9, the elastic member 521 may include a connecting end 521*a* and a free end 521*b*, the connecting end 521*a* is configured to be connected to the first end of the mounting member 52, and the free end 521*b* is bent toward the mounting member 52, and at least part of the elastic member 521 is configured to abut against the assembly bracket 6 to generate the rebound force.

Figure 7:
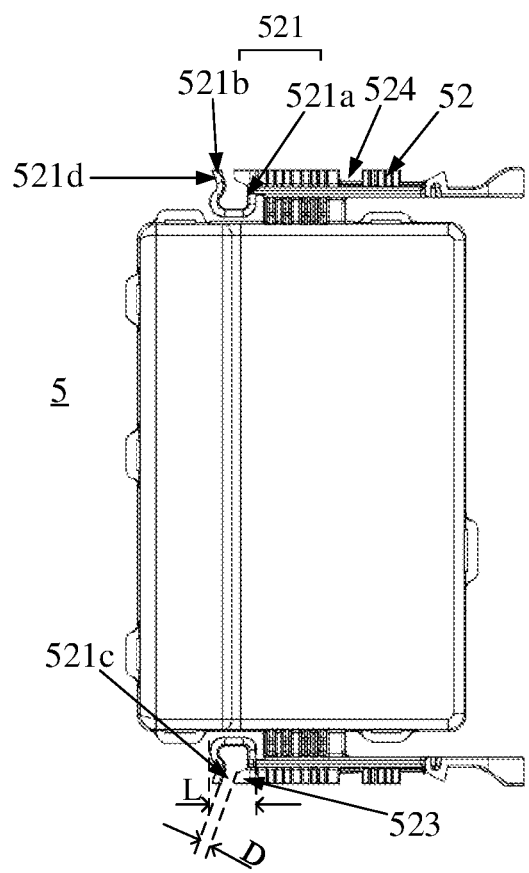
FIG. 7 is a schematic structural diagram illustrating that an elastic member of a casing for battery box is undeformed according to an embodiment of this application.
Figure 8:
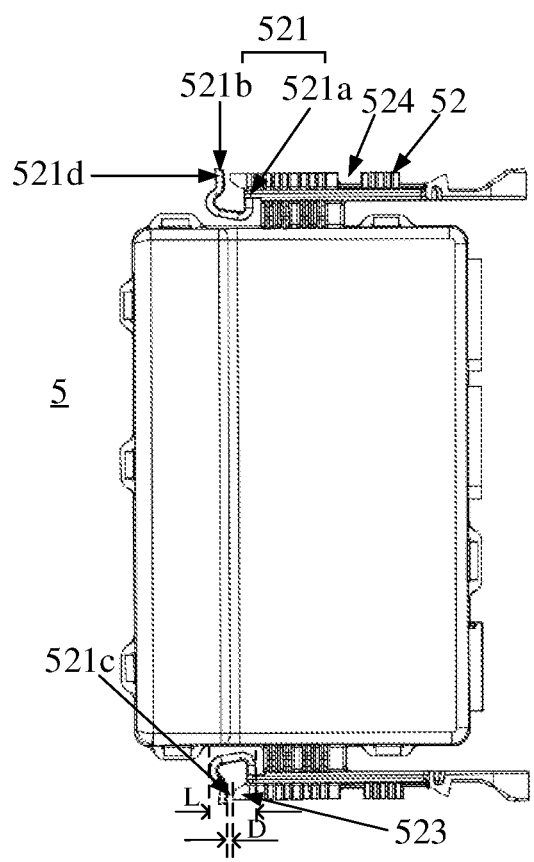
FIG. 8 is a schematic structural diagram illustrating that an elastic member of a casing for battery box is slightly deformed according to an embodiment of this application.
Figure 9:
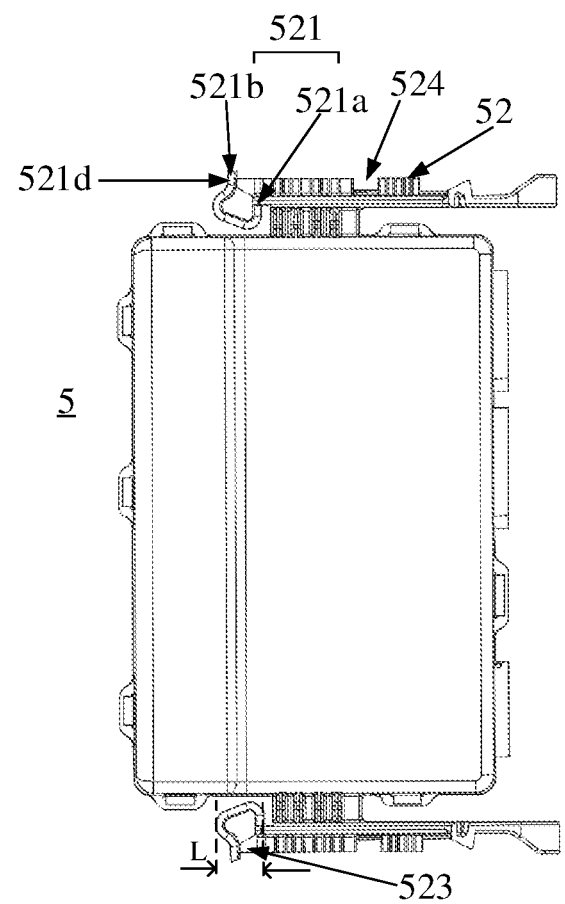
FIG. 9 is a schematic structural diagram illustrating that an elastic member of a casing for battery box is greatly deformed according to an embodiment of this application, where an opening size of the elastic member becomes zero.

The free end 521*b* of the elastic member 521 is bent toward the mounting member 52 to form a "C" shape shown in FIG. 7 in a natural state, and there is an opening 521*c* between the free end 521*b* and the connecting end 521*a*. When the elastic member 521 is compressed and deformed, if the amount of deformation is small, the opening 521*c* is narrowed, and as shown in FIG. 8, the opening 521*c* of the elastic member 521 in FIG. 8 is slightly narrowed compared with that in FIG. 7; or if the amount of deformation is large, the opening 521*c* is more narrowed or even disappears, and as shown in FIG. 9, the opening 521*c* of the elastic member 521 in FIG. 9 is more narrowed compared with that in FIG. 8, and a size of the opening 521*c* becomes zero. When the opening 521*c* disappears, the free end 521*b* is in contact with the first end of the mounting member 52. For example, the elastic member 521 may be an elastic tab.

At least part of the elastic member 521 that abuts against the assembly bracket 6 may refer to a bent part between the free end 521*b* and the connecting end 521*a*, or a part, closer to the free end 521*b*, of the elastic member 521. More specifically, if a part between the free end 521*b* of the elastic member 521 and the connecting end 521*a* includes an inner wall and an outer wall, at least part of the elastic member 521 abutting against the assembly bracket 6 means that at least part of an outer wall of a bent part between the free end 521*b* of the elastic member 521 and the connecting end 521*a* is in contact with the trough bottom 61*c*. Herein, the inner wall refers to a wall in the bent part that faces toward the mounting member 52, and the outer wall refers to a wall in the bent part that faces away from the mounting member 52.

The free end 521*b* of the elastic member 521 is bent toward the mounting member 52. When the casing 5 is pushed to specific extent from the trough opening 61*a* of the assembly trough 61 to the trough bottom 61*c*, at least part of the outer wall of the bent part of the elastic member 521 is in contact with the trough bottom 61*c*, and the elastic member 521 begins to deform to generate the rebound force. Under action of the rebound force, the location of the casing 5 on the assembly bracket 6 can be fixed.

In some embodiments, as shown in FIG. 7 to FIG. 9, the free end 521*b* has a straight section 521*d*, and a side, farther away from the mounting member 52, of the straight section 521*d* is configured to abut against the assembly bracket 6.

Straightness is relative to bending. Straightness does not necessarily indicate a plane, but can alternatively indicate a straight cylindrical surface. A shape of a side, farther away from the mounting member 52, of the straight section 521*d* can be set based on a shape of the trough bottom 61*c*. For example, when the trough bottom 61*c* is a plane, the side, farther away from the mounting member 52, of the straight section 521*d* can be planar. When the trough bottom 61*c* is a straight curved surface, the side, farther away from the mounting member 52, of the straight section 521*d* can be a straight cylindrical surface. That is, the shape of the side, farther away from the mounting member 52, of the straight section 521*d* can be the same as the shape of the trough bottom 61*c*, so that when the side, farther away from the mounting member 52, of the straight section 521*d* abuts against the trough bottom 61*c*, an abutting area is relatively large, and an abutting failure due to slipping is unlikely to occur.

Length of the straight section 521*d* can be set based on length of the trough bottom 61*c* of the assembly trough 61. For example, the length of the straight section 521*d* can be equal to the length of the trough bottom 61*c*. Certainly, in order to further avoid the abutting failure, the length of the straight section 521*d* may alternatively be slightly greater than the length of the trough bottom 61*c*, which is not limited in this embodiment of this application.

A straight section 521*d* is disposed at the free end 521*b*, and the straight section 521*d* abuts against the trough bottom 61*c* of the assembly bracket 6, which can increase an abutting surface, reduce a risk of slipping when the free end 521*b* abuts against the trough bottom 61*c*, and reduce a probability of abutting failure, thereby improving assembly stability of the casing 5 on the assembly bracket 6.

In some embodiments, the side, closer to the mounting member 52, of the straight section 521d may be a planar structure.

Based on the foregoing description, when the elastic member 521 is deformed under compression, and the amount of deformation is so large that the opening 521c of the elastic member 521 disappears, the free end 521b is in contact with the first end of the mounting member 52. Herein, the free end 521b being in contact with the first end of the mounting member 52 means that the side, closer to the mounting member 52, of the free end 521b is in contact with the first end of the mounting member 52.

When the free end 521b has a straight section 521d, and a side, closer to the mounting member 52, of the straight section 521d is in contact with the first end of the mounting member 52, if the side, closer to the mounting member 52, of the straight section 521d is a planar structure, each part of the planar structure can be configured to be in contact with the first end of the mounting member 52, and after the side, closer to the mounting member 52, of the straight section 521d is in contact with the first end of the mounting member 52, a failure of the elastic member 521 caused by excessive deformation of the elastic member 521 can be limited. Therefore, the side, closer to the mounting member 52, of the straight section 521d is set to be a planar structure, which can increase a limiting area of the side, closer to the mounting member 52, of the straight section 521d and avoid a failure of the elastic member 521 caused by a limitation failure of curvature of the elastic member 521 caused by a limitation failure of the side, closer to the mounting member 52, of the straight section 521d and the first end of the mounting member 52.

In some embodiments, as shown in FIG. 7 to FIG. 9, the first end of the mounting member 52 is further provided with a limiting portion 523, and the limiting portion 523 is configured to limit the curvature of the elastic member 521.

The limiting portion 523 and the mounting member 52 may be integrated, and in this case, the limiting portion 523 may be a bulge provided on the first end of the mounting member 52. The limiting portion 523 and the mounting member 52 may alternatively be formed separately, and the limiting portion 523 may be connected to the first end of the mounting member 52 via welding, screwing, or the like.

The limiting portion 523 is disposed on the first end of the mounting member 52 and faces toward the free end 521b of the elastic member 521, that is, the limiting portion 523 is located between the first end of the mounting member 52 and the free end 521b of the elastic member 521. When the amount of deformation of the elastic member 521 is relatively large, the free end 521b is in contact with the limiting portion 523 instead of the first end of the mounting member 52, thereby avoiding wear on the first end of the mounting member 52. In addition, the limiting portion 523 is closer to the free end 521b than the first end, which reduces a movable range of the free end 521b of the elastic member 521, so that the curvature of the limiting portion 523 is further limited to avoid a failure of the elastic member 521 caused by excessive deformation.

Further, in some embodiments, the limiting portion 523 has a limiting surface, and the limiting surface may be a planar structure.

The limiting surface of the limiting portion 523 refers to a surface, closer to the elastic member 521, of the limiting portion 523. When the elastic member 521 is compressed, the free end 521b moves toward the limiting portion 523, and when the free end 521b abuts against the limiting surface, the free end 521b cannot move any further, and the elastic member 521 cannot be further bent or deformed. It can be seen that the limiting surface can limit movement of the free end 521b, thereby limiting the curvature of the elastic member 521.

Setting the limiting surface as the planar structure facilitates provision of a large limiting surface for the free end 521b of the elastic member 521, so as to avoid a curvature limitation failure for the elastic member 521 caused by slipping of the free end 521b when abutting against the limiting surface.

Further, in some embodiments, the limiting surface is parallel to and opposite to the side, closer to the mounting member 52, of the free end 521b of the elastic member 521.

The side, closer to the mounting member 52, of the free end 521b of the elastic member 521 being parallel to and opposite to the limiting surface of the limiting portion 523 greatly increases the abutting surface of the free end 521b when abutting against the limiting surface, which can avoid a limitation failure caused by slipping, thereby effectively limiting the curvature of the elastic member 521.

It can be understood that, in a case that the limiting surface is the planar structure, and the side, closer to the mounting member 52, of the free end 521b of the elastic member 521 is also the planar structure, the limiting surface is set to be parallel to and opposite to the side, closer to the mounting member 52, of the free end 521b of the elastic member 521, which can further increase the abutting surface of the free end 521b when abutting against the limiting surface, thereby avoiding a limitation failure or limitation unavailability, and improving assembly stability of the casing 5 on the assembly bracket 6.

In some embodiments, a maximum distance between a bent portion of the elastic member 521 and the connecting end 521a is L, and a distance between the free end 521b limiting portion 523 is D, where L=(3.5 to 4.5)*D.

The free end 521b of the elastic member 521 is bent toward the mounting member 52 to form a bent portion, and a maximum distance between the bent portion and the connecting end 521a is also maximum length of the elastic member 521 having the opening 521c in a natural state. When the elastic member 521 is deformed under compression, the length is reduced. The distance between the free end 521b and the limiting portion 523 is equivalent to a size of the opening 521c of the elastic member 521.

Each elastic member 521 has a maximum deformation limit. When L and D meet a multiple relationship of 3.5 to 4.5, the elastic member 521 can be deformed under action of the pushing force, and the rebound force generated after deformation can keep a location of the casing 5 on the assembly bracket 6 unchanged, and the amount of deformation is within a deformation capacity range of the elastic member 521. That is, when L and D satisfy the foregoing multiple relationship, the elastic member 521 can be deformed within an elastic deformation capacity range of the elastic member 521, and the rebound force generated by the elastic member 521 can keep the location of the casing 5 on the assembly bracket 6 unchanged.

In some embodiments, as shown in FIG. 5, the casing 5 provided in this embodiment of this application may further include a limiting plate 53. Two opposite plate surfaces of the limiting plate 53 are respectively fixed on the body 51 and the mounting member 52, and at least part of the limiting plate 53 is configured to abut against an inner wall of the assembly bracket 6 to fix the casing 5 at a location on the assembly bracket 6.

There may be two limiting plates 53, and the two limiting plates 53 are located on opposite sides of the body 51. Any limiting plate 53 is located between the body 51 and the mounting member 52, and the limiting plate 53 has two large plate surfaces at opposite locations. These two large plate surfaces are parallel to the body 51 and the mounting member 52. One of these two plate surfaces that is closer to the body 51 is connected to the body 51, and the other plate surface closer to the mounting member 52 is connected to the mounting member 52. A connection method can be welding, bolt connection, buckle connection, or the like.

Based on the foregoing description, the assembly bracket 6 has two walls at opposite locations, and two wall surfaces close to each other in the two walls are inner walls of the assembly bracket 6. When the entire casing 5 is pushed from the trough opening 61a of the assembly trough 61 to the trough bottom 61c, at least part of a plate surface of a limiting plate 53 can be in contact with an inner wall of the assembly bracket 6, and at least part of a plate surface of the other limiting plate 53 can be in contact with another inner wall of the assembly bracket 6, so that the mounting member 52 can be well guided and positioned to ensure that the two mounting members 52 on the two sides of the body 51 are exactly located in the corresponding assembly trough 61. In addition, the two limiting plates 53 can have a limiting function, to avoid a decrease in assembly stability of the casing 5 on the assembly bracket 6 caused because the casing 5 moves in a direction of a line connecting the two opposite walls of the assembly bracket 6.

In some embodiments, as shown in FIG. 5 to FIG. 9, the mounting member 52 has at least one notch 524 along an extension direction of the mounting member 52.

When there is one notch 524, the notch 524 can be disposed at any location on the mounting member 52. When there are a plurality of notches 524, the plurality of notches 524 can be disposed at intervals in the extension direction of the mounting member 52, there is a gap between each two of the plurality of notches 524, and a plurality of formed gaps may be equal or unequal, which is not limited in this embodiment of this application.

The mounting member 52 has two opposite surfaces parallel to the trough wall 61b. For any notch 524, the notch 524 can be disposed on either of the two surfaces, or can alternatively penetrate through one of the two surfaces to another surface.

The mounting member 52 is provided with at least one notch 524 along the extension direction of the mounting member 52. Weight of the mounting member 52 can be reduced, so that weight of the casing 5 can be reduced. In addition, surface areas of the two opposite surfaces of the mounting member 52 that are parallel to the trough wall 61b can be reduced, and therefore, a contact area between the mounting member 52 and the trough wall 61b can be reduced, and a frictional force between the mounting member 52 and the trough wall 61b can be reduced when the casing 5 is pushed into the assembly trough 61, to avoid wear on the mounting member 52 and the trough wall 61b, which can also reduce the pushing force to facilitate pushing of the casing 5 into the assembly trough 61, thereby improving assembly efficiency of the casing 5.

In some embodiments, this application also provides a box for the battery 100, including an assembly bracket 6 and the casing 5 in any one of the foregoing embodiments, where the casing 5 is assembled on the assembly bracket 6.

The assembly bracket 6 is briefly illustrated in the foregoing embodiments. Herein, it should be additionally illustrated that a plurality pairs of assembly troughs 61 can be disposed on the assembly bracket 6, and therefore, one assembly bracket 6 can be configured to fix a plurality of casings 5.

One or more sets of track structures can be disposed in the casing 5 to place one or more PCBA (printed circuit board assembly, printed circuit board assembly) boards. Herein, the track structure can be a trough or a set of bulge structures at opposite locations disposed in the inner wall of the casing 5, as long as a supporting function can be exerted for the PCBA boards, which is not limited in this embodiment of this application.

Herein, for related description of the casing 5, refer to the foregoing embodiments. Details are not described herein again.

In some embodiments, this application further provides a battery 100, including a battery cell 400 and the box in the foregoing embodiments, where the box is configured to accommodate the battery cell 400.

One or more battery cells 400 can be accommodated in one box. For related description of the battery cell 400, refer to the foregoing embodiments. Details are not described herein again.

In some embodiments, this application further provides an electric apparatus, including the battery 100 in the foregoing embodiments, where the battery 100 is configured to supply electric energy for the electric apparatus.

The electric apparatus may be any one of the foregoing devices or systems using the battery 100.

In conclusion, in this embodiment of this application, by virtue of the rebound force generated by the elastic member 521 under the limitation of the assembly bracket 6, the location of the mounting member 52 on the assembly bracket 6 is fixed, so that the location of the casing 5 on the assembly bracket 6 is fixed. This application provides a new assembly method for the casing 5, so that assembly methods of the casing 5 are enriched. In addition, during mounting of the casing 5, no additional accessory is required, and the casing 5 only needs to be pushed into the assembly trough 61 for clamping, thereby achieving a simple mounting process and high assembly efficiency, and saving manpower. In addition, the elastic member 521 generates the rebound force under the limitation of the assembly bracket 6, and even if the casing 5 vibrates during use, the rebound force can counteract a force generated due to the vibration, so that the casing 5 is firmly fixed on the assembly bracket 6, thereby preventing the casing 5 from shaking on the assembly bracket 6, improving mounting stability of the casing 5, and avoiding a safety risk.

Persons skilled in the art can understand that, although some of the embodiments described herein include some but not other features included in other embodiments, combinations of features of different embodiments are meant to be within the scope of this application and form different embodiments. For example, in the claims, any one of the claimed embodiments may be used in any combination.

In conclusion, the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A casing for a battery box, comprising:
a body configured to accommodate a battery management system; and
a mounting member fixed on the body;
wherein the mounting member comprises a first end and a second end at opposite locations, the first end is provided with an elastic member, the second end is provided with a clamping portion, the clamping portion is configured to be clamped to an assembly bracket, and the elastic member is configured to generate a rebound force under limitation of the assembly bracket, so as to fix the mounting member at a location on the assembly bracket, and wherein the elastic member comprises a connecting end and a free end, the connecting end is configured to be connected to the first end, the free end is bent toward the mounting member, the free end has a straight section, and a side of the straight section that is oriented away from the mounting member is configured to abut against the assembly bracket to generate the rebound force.

2. The casing according to claim 1, wherein the first end is further provided with a limiting portion, and the limiting portion is configured to limit curvature of the elastic member.

3. The casing according to claim 2, wherein a maximum distance L between a bent portion of the elastic member and the connecting end and a distance D between the free end and the limiting portion satisfy L=(3.5 to 4.5)*D.

4. The casing according to claim 1, further comprising:
a limiting plate, wherein two opposite plate surfaces of the limiting plate are respectively fixed on the body and the mounting member, and at least part of the limiting plate is configured to abut against an inner wall of the assembly bracket to fix the casing at a location on the assembly bracket.

5. The casing according to claim 1, wherein the mounting member has at least one notch along an extension direction of the mounting member.

6. A battery box, comprising:
an assembly bracket; and
the casing according to claim 1, wherein the casing is mounted on the assembly bracket.

7. A battery, comprising:
a battery cell; and
the box according to claim 6, wherein the box is configured to accommodate the battery cell.

8. An electric apparatus comprising the battery according to claim 7, wherein the battery is configured to supply electric energy.

* * * * *